(12) United States Patent
Hiller

(10) Patent No.: US 6,396,483 B1
(45) Date of Patent: *May 28, 2002

(54) KEYBOARD INCORPORATING MULTI-FUNCTION FLAT-PANEL INPUT DEVICE AND/OR DISPLAY

(76) Inventor: Jeffrey H. Hiller, 4 Brittany Meadows, Atherton, CA (US) 94027

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 820 days.

(21) Appl. No.: 08/671,935

(22) Filed: Jun. 28, 1996

(51) Int. Cl.[7] ................................................. G09G 5/00
(52) U.S. Cl. ...................................... 345/173; 345/168
(58) Field of Search ................................. 345/173, 168, 345/157, 179, 156, 160, 169, 172; 341/22, 23; 178/18, 19

(56) References Cited

U.S. PATENT DOCUMENTS

| | | | |
|---|---|---|---|
| 4,181,966 A | 1/1980 | Wenninger et al. | 364/715 |
| 4,786,768 A | 11/1988 | Langewis et al. | 200/6 A |
| 5,034,574 A | 7/1991 | Martovitz | 200/6 A |
| 5,049,863 A | 9/1991 | Oka | 340/710 |
| 5,307,297 A | 4/1994 | Iguchi et al. | 364/708.1 |
| 5,410,305 A * | 4/1995 | Barrus et al. | 345/168 |
| 5,411,341 A | 5/1995 | Ullman | 400/489 |
| 5,438,331 A | 8/1995 | Gilligan et al. | 341/35 |
| 5,442,378 A | 8/1995 | Yasuhara et al. | 345/168 |
| 5,452,960 A | 9/1995 | Kuhlenschmidt | 400/487 |
| 5,469,194 A * | 11/1995 | Clark et al. | 345/173 |
| 5,489,924 A * | 2/1996 | Shima et al. | 345/173 |
| 5,581,243 A * | 12/1996 | Ouellette et al. | 345/173 |
| 5,612,718 A * | 3/1997 | Bryan | 345/168 |

* cited by examiner

*Primary Examiner*—Regina Liang
(74) *Attorney, Agent, or Firm*—Burns Doane Swecker & Mathis, LLP

(57) ABSTRACT

A flat input device and/or display is incorporated into a computer keyboard. The flat input device is multi-functional and may be used to realize a virtual keypad/mouse. The virtual keypad/mouse is a touch-sensitive device that in one mode of operation functions as a numeric keypad and in another mode of operation functions as a mouse, i.e., a pointing device for positioning a cursor. In still another mode of operation, the device may operate as a digitizer. The virtual keypad/mouse may be connected to the computer by a cable in addition to the conventional keyboard cable. A flat panel display may be used in lieu of or in addition to a conventional computer monitor, for viewing documents, for videoconferencing, collaborative work, etc.

7 Claims, 7 Drawing Sheets

KEYBOARD INCORPORATING MULTI-FUNCTION FLAT-PANEL INPUT DEVICE AND/OR DISPLAY

BACKGROUND OF THE INVENTION

1. Field of the Invention

The present invention relates to computer I/O for personal computers.

2. State of the Art

Personal computing is presently in a state of flux as personal computers having computing power rivaling the mainframe computers of not many years ago become widely available at affordable prices. Available computing power has passed the threshold required for many computationally intensive tasks, making possible multimedia, or media-rich, computing without the need for expensive hardware. Because of strong consumer demand, opportunities for computer hardware and software companies have seldom seemed brighter, and personal computing appears to have nearly taken on the status of a national obsession.

The usefulness of personal computers, however, depends on the ability to connect to the computer varied peripheral devices including keyboard, mouse, display, printer, scanner, disk drive, modem, speakers, a microphone, etc. A typical computer is provided with specific connectors for many of these devices as well as general-purpose connectors that may serve any of a wide variety of devices. Despite the desirability of such expansion capabilities, the result is often a maze of cables and a crowded, visually distracting work area. To avoid this situation, computer makers are continually exercising trade-offs between what to include internal to the computer and what to provide external connections for. Still, as the breath-taking pace of innovation in personal computers continues, considerable difficulty remains in providing connections to the computer in order to achieve an attractive trade-off between functionality on the one hand and simplicity on the other.

A known keyboard previously sold by Keytronics Corporation incorporated a flat membrane switch device in lieu of mechanical switches in the numeric keypad area of the keyboard. The membrane switch served no other function, however, than as a substitute for the equivalent mechanical keys of the numeric keypad.

SUMMARY OF THE INVENTION

The present invention address the foregoing problem by first recognizing that one peripheral already present in the bulk of all desktop systems is a keyboard. In accordance with one aspect of the invention there is incorporated into the keyboard a flat input device such as a touchpad or digitizer. The flat input device may be used to realize a virtual keypad/mouse. The virtual keypad/mouse is a touch-sensitive device that in one mode of operation functions as a numeric keypad and in another mode of operation functions as a mouse, i.e., a pointing device for positioning a cursor. In still another mode of operation, the device may operate as a digitizer. The virtual keypad/mouse may be connected to the computer by a cable in addition to the conventional keyboard cable. In accordance with another aspect of the invention, there is incorporated into the keyboard a flat-panel display. The display may serve in lieu of or in addition to a conventional CRT display. In accordance with still another aspect of the invention, both a flat input device and a flat display device are provided, the flat input device overlying the flat display.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
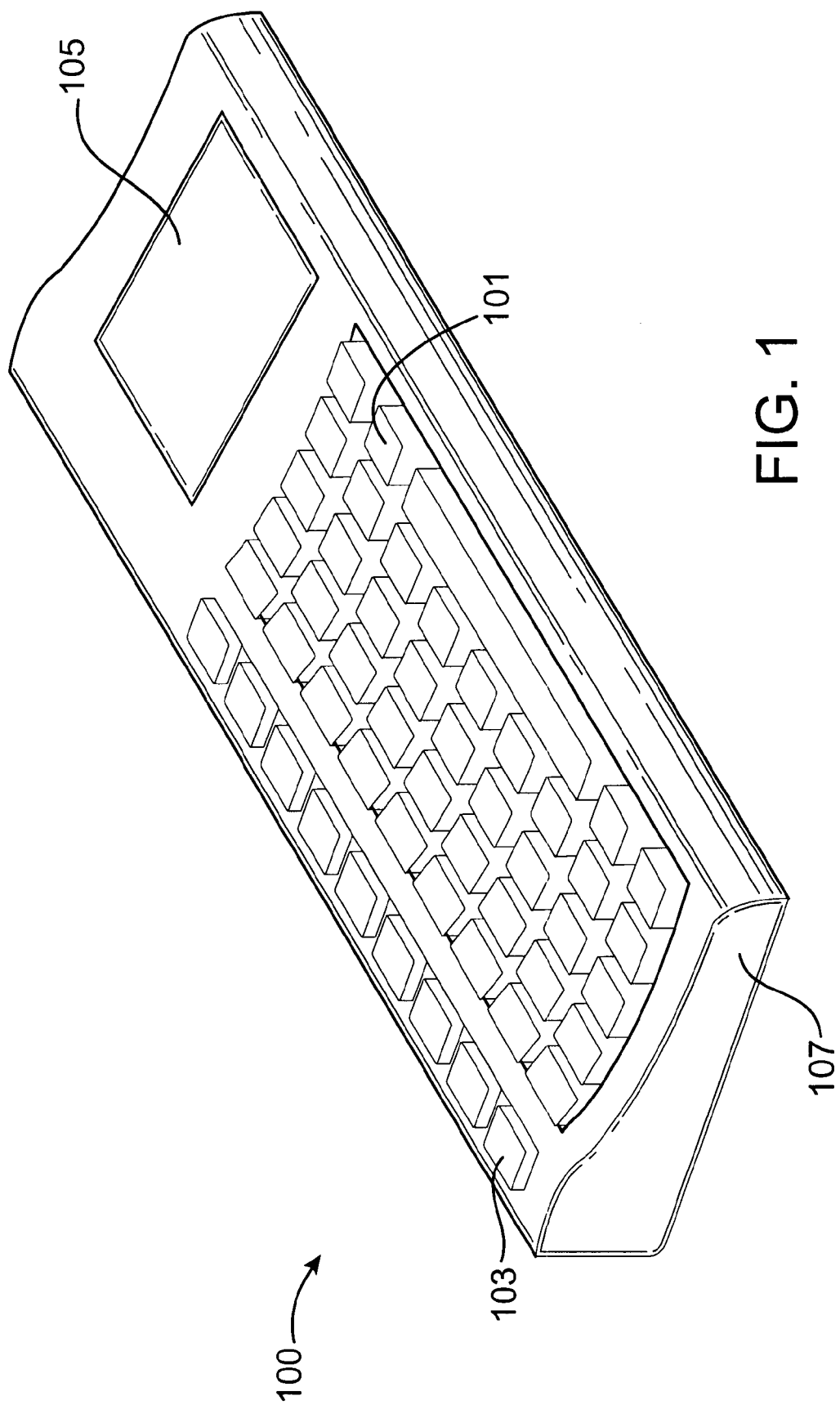
FIG. 1 is a perspective view of a computer keyboard including a virtual keyboard/mouse.

Referring now to FIG. 1, a perspective view is shown of a keyboard 100 in accordance with one aspect of the invention. In an illustrated embodiment, the keyboard 100 differs somewhat from a conventional keyboard in the arrangement. In a convention keyboard, keys are arrayed in three principle areas of the keyboard, including a "QUERTY" area, a function-key area, and a numeric keypad area. In operation, however, the numeric keypad is seldom used. An opportunity is therefore presented to make more effective use of this area. The keyboard 100 makes more effective use of what would normally be the numeric keypad area, without sacrificing the functionality of a numeric keypad.

In particular, unlike a conventional keyboard, the keyboard 100 provides within the numeric keypad area a flat input device 105. The arrangement of keys within a QUERTY area 101 and a function-key area 103 of the keyboard 100 may be substantially unchanged from a conventional keyboard. In one embodiment, the flat input device is used to realize a touch-sensitive virtual keypad/mouse, for example.

Figure 2:
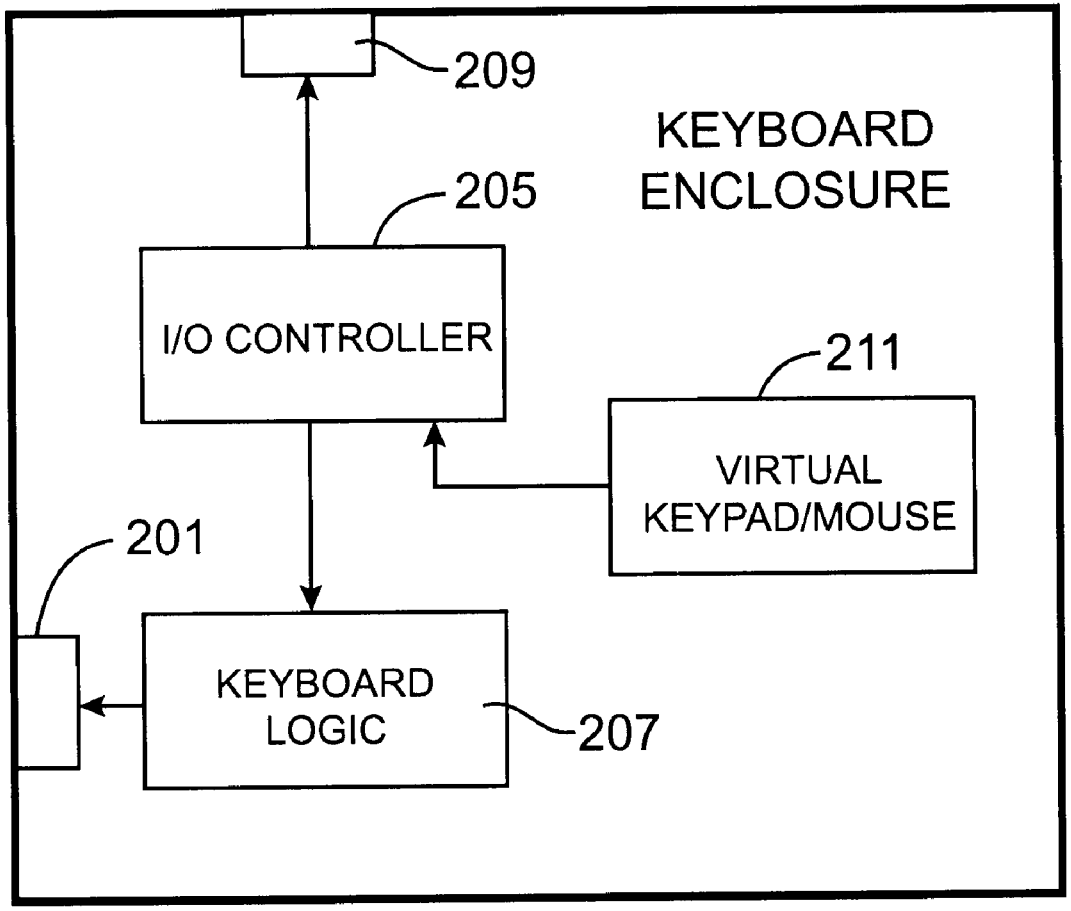
FIG. 2 is a hardware block diagram of the keyboard of FIG. 1.

Referring more particularly to FIG. 2, a hardware block diagram is shown of the keyboard of FIG. 1. Keyboard logic 207 is connected to a serial port connector 201 of the keyboard. An I/O controller 205 includes circuitry to satisfy the particularized I/O requirements of the virtual keypad/mouse 211, and may be realized as an Application-Specific Integrated Circuit (ASIC), for example. The I/O controller is connected to the keyboard logic 207 to enable the virtual keypad/mouse to function as a numeric keypad in one mode of operation. The I/O controller is also connected to a further port connector 209 for connection to the computer. During modes other than numeric keypad mode, information is sent to the computer through the port connector 209.

The virtual keypad/mouse 211 may be realized using an LCD panel in conjunction with a commercially available touchpad such as the WriteTouch™ touch-pad, available from Scriptel Corporation of Columbus, Ohio. As distinguished from other technologies, WriteTouch has the accuracy required for pointing, digital ink, and handwriting recognition with a stylus, and in addition has the capability to accept input from the touch of a finger. The WriteTouch system includes a cordless stylus cartridge which transmits a signal to a sensor, ITO (Indium Tin Oxide) coatings (e.g., sensor, electrical noise shield) on the back of the LCD's protective glass which picks up the signal induced by the pen or the finger, a single-chip controller that drives the system by calculating the stylus or finger position from the signal variations at the four corners of the sensor; and software drivers which interface to a computer operating system. Other suitable flat input devices include devices sold by Wacom Corporation of Vancouver, Wash.

Figure 3:
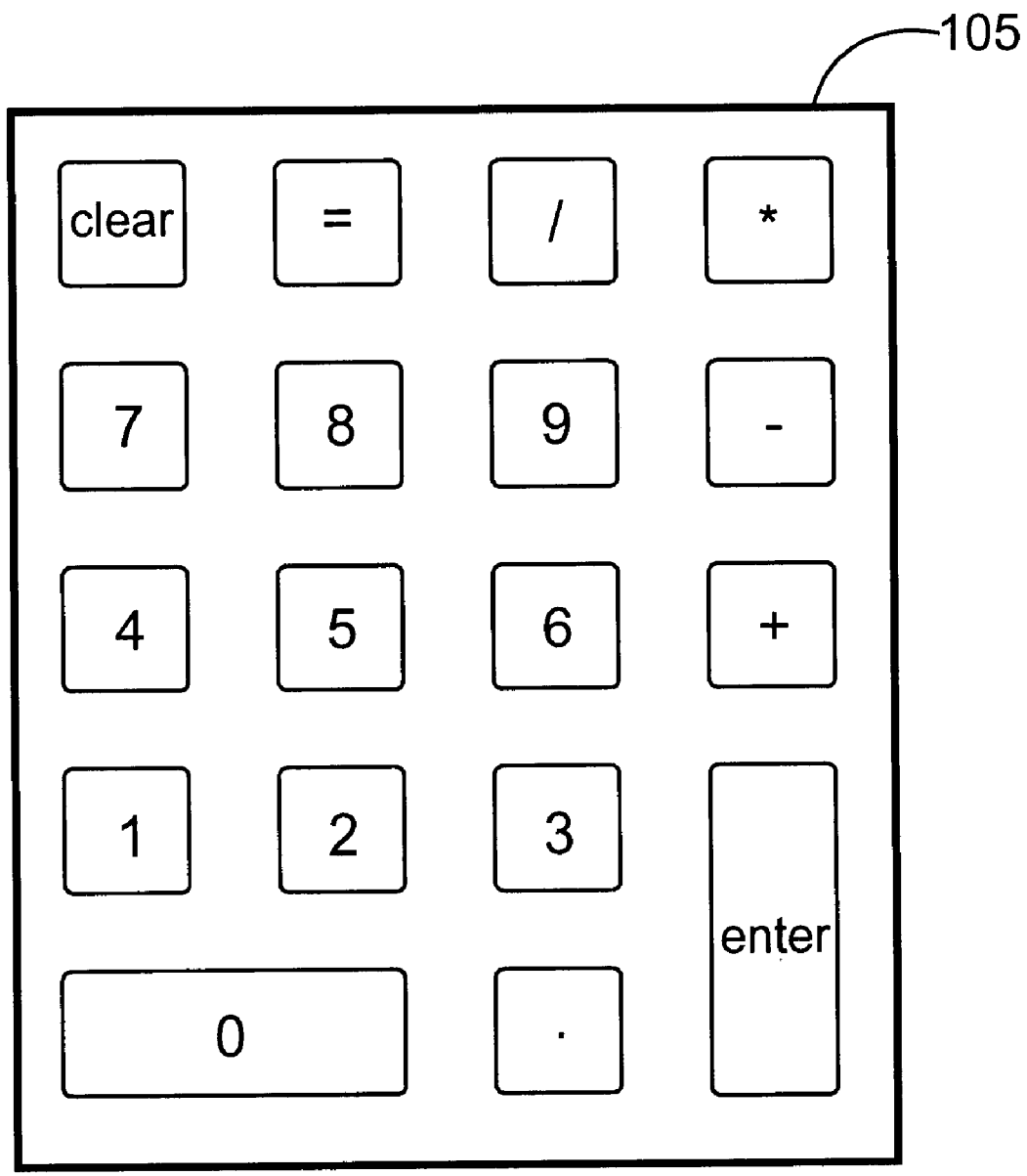
FIG. 3 is an enlarged view of the virtual keypad/mouse in a keypad mode of operation.

Referring to FIG. 3, in a default mode of operation, the virtual keypad/mouse operates in a keypad mode in which the image of a conventional keypad is displayed on the LCD. The user uses the keypad by touching the desired key. The touch of the user's finger in relation to the desired key is sensed by the touchpad, causing a code representing actuation of the "key" to be output by the keyboard.

Figure 4:
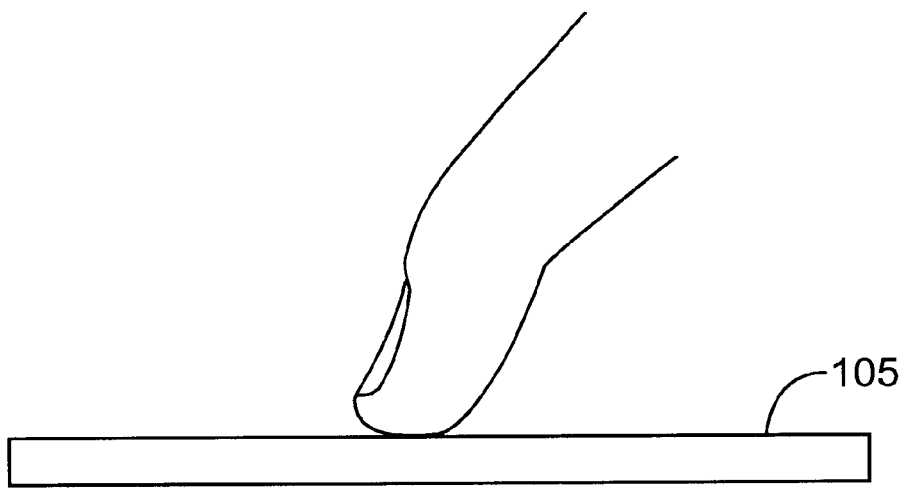
FIG. 4 is an enlarged view of the virtual keypad/mouse in a mouse mode of operation.

Referring to FIG. 4, the virtual keypad/mouse may be placed in a mouse mode of operation by simply beginning to use it as a mouse in like manner as commercially -available touchpad pointing devices. Touchpad pointing devices are commercially available from such companies as Cirque, Inc. of Salt Lake City, Utah, Alps Electronics of San Jose, Calif. and Touche, Inc., also of San Jose, Calif. The manner of operation of such devices is well-known. The user simply moves a finger across the surface of the touch membrane in a direction in which the user desires the cursor to move. Particulars of how the speed at which the cursor is moved is controlled, how clicking and dragging are accomplished, etc., vary from device to device. These particulars are well-known, and are not especially germane to the present invention.

Figure 5:
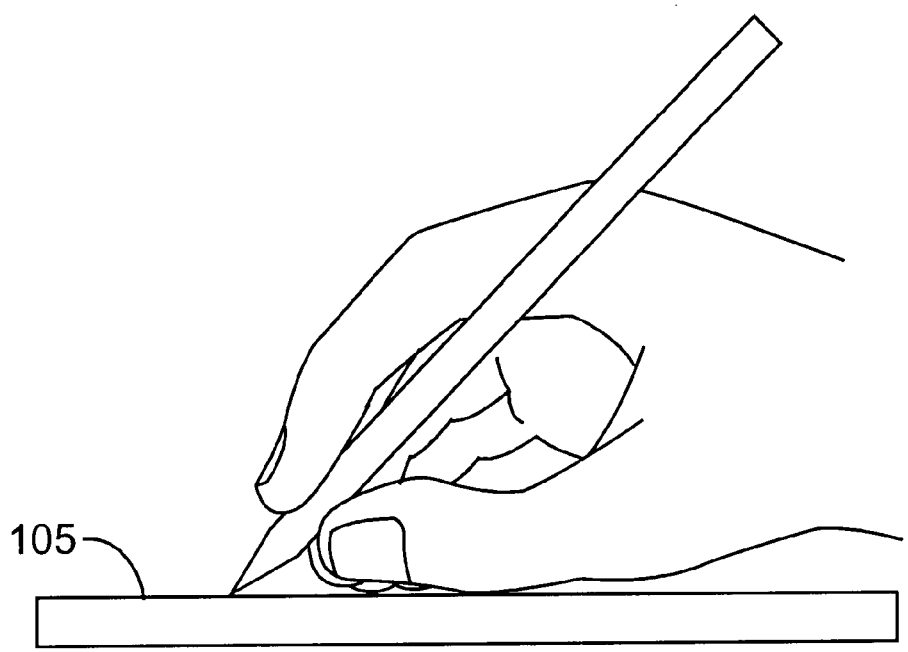
FIG. 5 is an enlarged view of the virtual keypad/mouse in a digitizer mode of operation.

Referring to FIG. 5, the virtual keypad/mouse may be placed in a digitizer mode of operation by commencing use of the WriteTouch active stylus. In this mode of operation, the user may enter graphics or may enter text using conventional handwriting-recognition techniques.

An important application of the digitizer mode of operation is the capture and transmission of personal signatures for transmission over the Internet, thereby facilitating electronic commerce.

Various modifications may be made to the touch-sensitive keypad/mouse as described. Rather than provide an LCD display to display touch keys for the numeric keypad, touch keys may be printed on the touchpad itself. Furthermore, the program logic of the touch-sensitive keypad/mouse may be simplified by toggling between the various functions using keyboard commands, rather than sensing the different operational modes through the touchpad itself.

In the embodiments heretofore described, and LCD has been described as allowing different indicia to be displayed or not displayed to the user during different modes of operation. The display of such indicia or the lack thereof is typically fixed throughout that mode of operation. In accordance with another embodiment of the invention, an LCD incorporated into a keyboard is used as a video display to time-varying information. Such information may include documents, motion video, etc.

Figure 6:
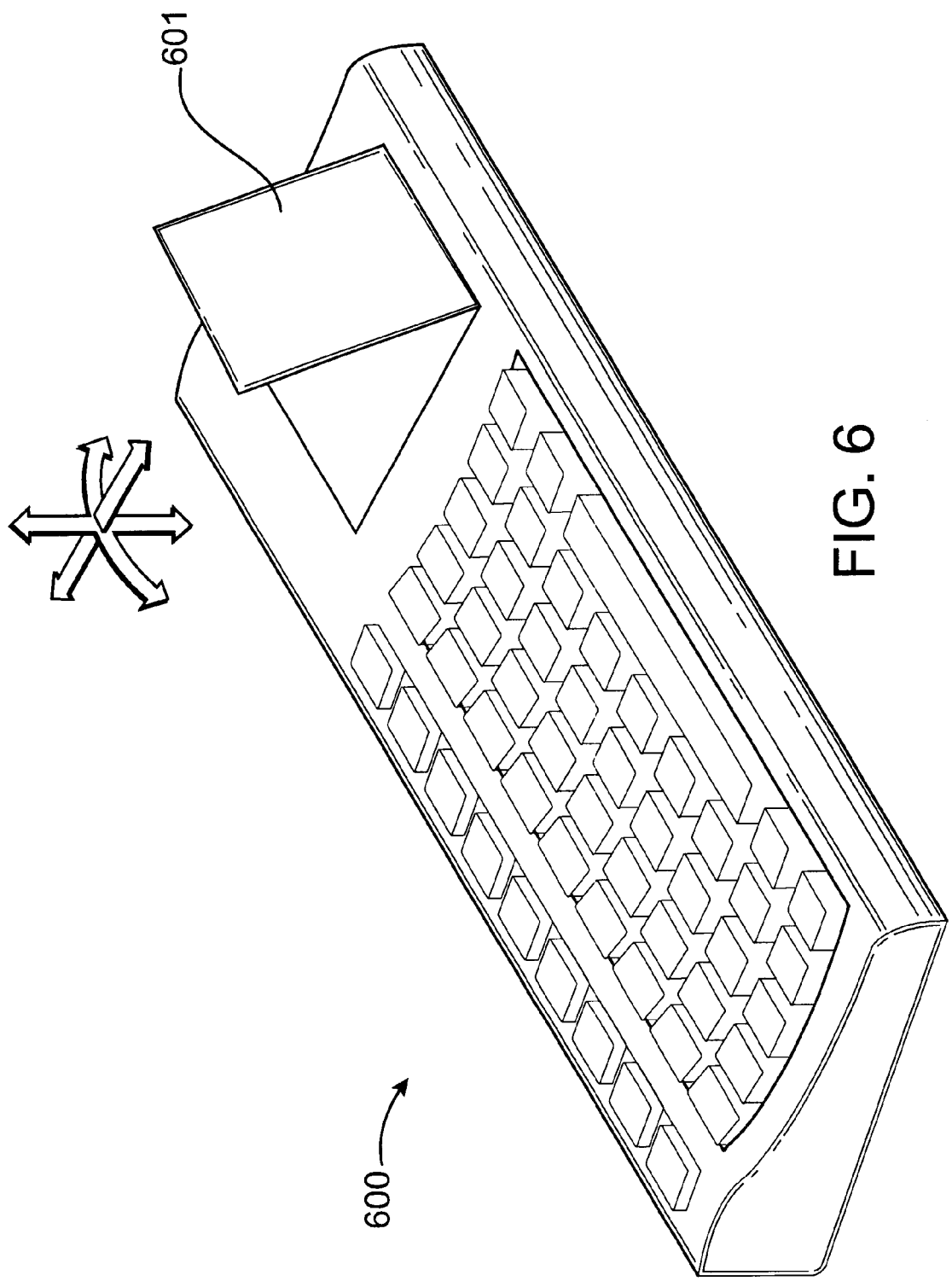
FIG. 6 is a perspective view of a computer keyboard including an adjustable LCD display.

Referring to FIG. 6, a perspective view is shown of a keyboard 600 incorporating a flat-panel display 601. The flat-panel display is preferably adjustable, enabling it to be raised, rotated, etc. The flat-panel display may also be adjustable forward and backward if desired.

Figure 7:
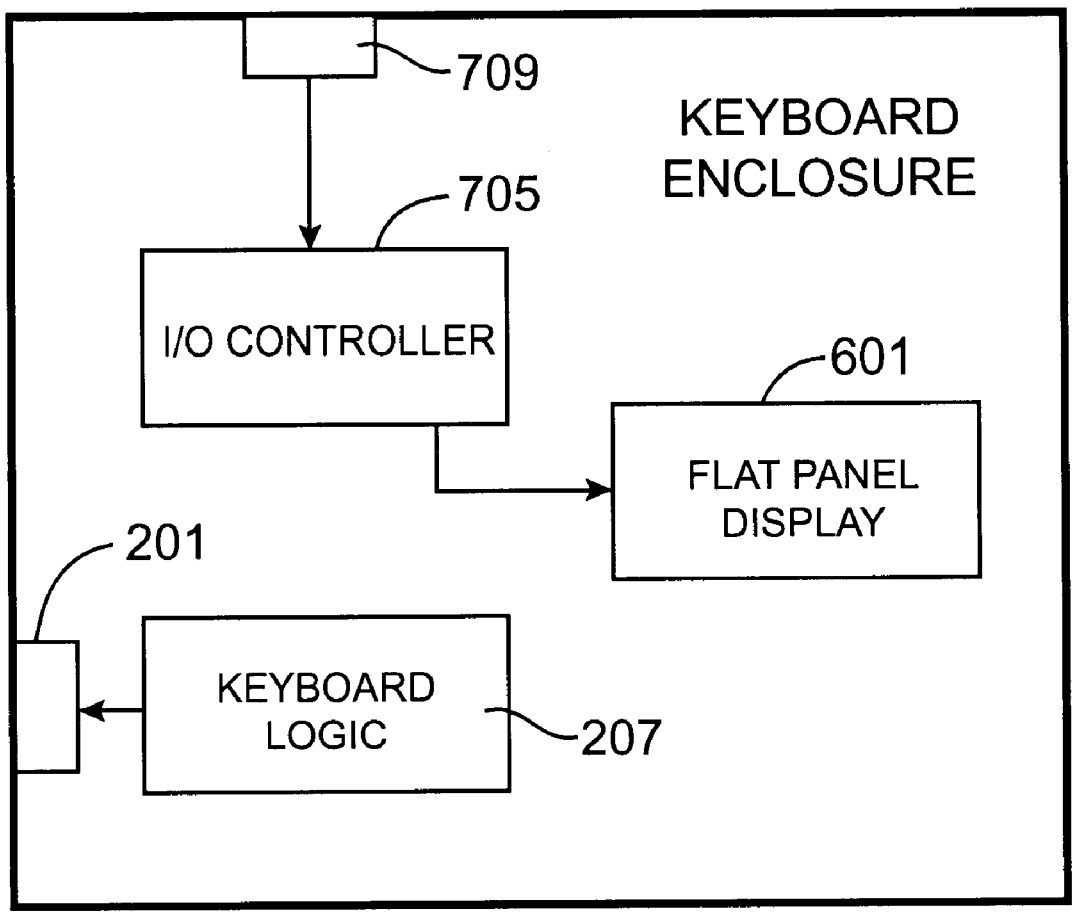
FIG. 7 is a hardware block diagram of the keyboard of FIG. 6.

Referring to FIG. 7, as in the previous embodiment, keyboard logic 207 is connected to a serial port connector 201 of the keyboard. An I/O controller 705 includes video controller circuitry to satisfy the particularized I/O requirements of the flat panel display 601, and may be realized as an Application-Specific Integrated Circuit (ASIC), for example. The I/O controller is also connected to a video port connector 709 for connection to the computer.

Figure 8:
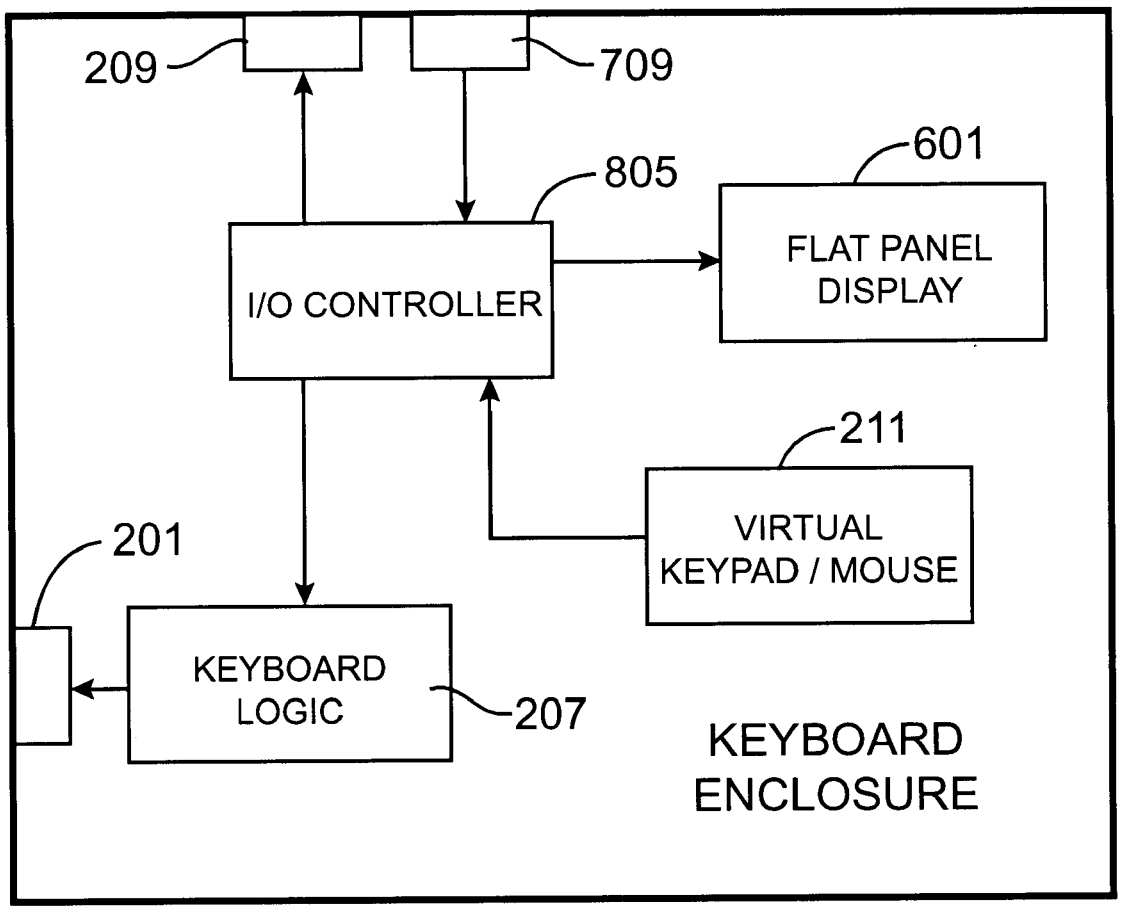
FIG. 8 is a hardware block diagram of a further embodiment of the invention.

Referring to FIG. 8, in accordance with another embodiment of the invention, the features of the embodiments of FIG. 7 and FIG. 2 may be combined in a a single device. The flat input device is overlaid on the flat panel display in the manner described previously. However the display, instead of displaying only "passive" content, is used as an active video display. The resulting keyboard is thus provided with both an adjustable flat-panel display and a virtual keypad/mouse or other multi-function flat input device. The adjustability of the flat panel display and the flat input device may be used to advantage for both input and output. That is, the orientation of the device plane may be adjusted either for viewing of the display or for convenient and stress-free input.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer keyboard, comprising:

a keyboard housing:

keys within a QUERTY area of the keyboard, at least some of the keys having indicia permanently affixed thereto; and within another area of the keyboard, in lieu of keys, a touch-sensitive pad;

wherein the touch-sensitive pad is operable in a plurality of the following modes: a trackpad mode in which movement of a finger across the touchpad results in movement of a cursor across a computer display; a keypad mode of operation in which touch keys are pressed; and a digitizer mode of operation in which movement of a stylus is sensed.

2. The apparatus of claim 1, wherein said another area of the keyboard is a numeric keypad area of the keyboard.

3. The apparatus of claim 2, wherein touch keys are printed on a surface of the touchpad.

4. The apparatus of claim 2, wherein the touchpad overlies a flat panel display, and touch keys are displayed on the flat panel display.

5. The apparatus of claim 2, further comprising means for switching between said modes.

6. The apparatus of claim 5, wherein said means for switching between modes includes a toggle switch.

7. The apparatus of claim 5, wherein said means for switching between modes includes logic for distinguishing between user inputs in different modes of operation.

* * * * *